(12) United States Patent
Aragnou et al.

(10) Patent No.: US 10,014,688 B2
(45) Date of Patent: Jul. 3, 2018

(54) SIMULATION CIRCUIT OF AN ALTERNATING ELECTRIC GRID AND METHOD FOR CONTROLLING SAME

(71) Applicant: Electricite De France, Paris (FR)

(72) Inventors: Franck Aragnou, Moret sur Loing (FR); Denis Cardoso-Rodrigues, Aix en Provence (FR)

(73) Assignee: Electricite de France (FR)

( * ) Notice: Subject to any disclaimer, the term of this patent is extended or adjusted under 35 U.S.C. 154(b) by 192 days.

(21) Appl. No.: 14/902,816

(22) PCT Filed: Jul. 3, 2014

(86) PCT No.: PCT/EP2014/064254
§ 371 (c)(1),
(2) Date: Jan. 4, 2016

(87) PCT Pub. No.: WO2015/001055
PCT Pub. Date: Jan. 8, 2015

(65) Prior Publication Data
US 2016/0197480 A1     Jul. 7, 2016

(30) Foreign Application Priority Data
Jul. 5, 2013   (FR) ..................... 13 56670

(51) Int. Cl.
*H02J 3/38*      (2006.01)
*H02S 40/32*     (2014.01)
(Continued)

(52) U.S. Cl.
CPC ............ *H02J 3/383* (2013.01); *H02J 7/0068* (2013.01); *H02M 7/66* (2013.01); *H02S 40/32* (2014.12);
(Continued)

(58) Field of Classification Search
CPC ..... H02J 2003/007; H02J 3/383; H02J 7/0068
(Continued)

(56) References Cited

U.S. PATENT DOCUMENTS 6,239,511 B1    5/2001  Joho
2011/0175662 A1* 7/2011 Said El-Barbari
........................ H01L 31/02021
327/319

(Continued)

FOREIGN PATENT DOCUMENTS

CN    202818122 U    3/2013
DE    19839636 A1    3/2000
(Continued)

OTHER PUBLICATIONS

International Search Report for Application No. PCT/EP2014/064254 dated Oct. 20, 2014.
(Continued)

*Primary Examiner* — John Poos
(74) *Attorney, Agent, or Firm* — Lerner, David, Littenberg, Krumholz & Mentlik, LLP

(57) ABSTRACT

The invention relates to a simulation circuit of an alternating electric grid, the circuit having at least one alternating port, a bank of first resistances that can be selectively connected to the alternating port by connecting means. According to the invention, the circuit comprises a reversible AC-DC converter comprising an alternating side connected to the alternating port and a direct side connected to a sub-circuit for dissipating energy into direct current connected to an electric battery able to be charged with direct current and discharged with direct current.

14 Claims, 5 Drawing Sheets

(51) Int. Cl.
*H02J 7/00* (2006.01)
*H02M 7/66* (2006.01)
*H02J 3/00* (2006.01)

(52) U.S. Cl.
CPC ....... *H02J 2003/007* (2013.01); *Y02E 10/563* (2013.01); *Y02E 60/76* (2013.01); *Y04S 40/22* (2013.01)

(58) Field of Classification Search
USPC ........................................ 307/25, 26; 363/95
See application file for complete search history.

(56) References Cited

U.S. PATENT DOCUMENTS

| | | | | |
|---|---|---|---|---|
| 2012/0155125 A1* | 6/2012 | Zhang | .................... | H02M 1/44 363/34 |
| 2013/0063993 A1* | 3/2013 | Liu | .................... | G01R 31/085 363/95 |
| 2014/0167505 A1 | 6/2014 | Beck | | |

FOREIGN PATENT DOCUMENTS

| | | |
|---|---|---|
| DE | 102011008891 A1 | 7/2012 |
| DE | 102011111192 A1 | 2/2013 |

OTHER PUBLICATIONS

Peter Hacke et al: "Testing and Analysis for Lifetime Prediction of Crystalline Silicon PV Modules Undergoing Degradation by System Voltage Stress", IEEE Journal of Photovoltaics, IEEE, US, vol. 3, No. 1, Jan. 1, 2013, pp. 246-253, XP011482204.

Tony Sample: "Failure modes and degradation rates from field-aged crystalline silicon modules", Feb. 17, 2011, XP055105933, <http://www1.eere.energy.gov/solar/pdfs/pvmrw2011_28_csi_sample.pdf>, [retrieved on Mar. 6, 2014] pp. 8,14.

* cited by examiner

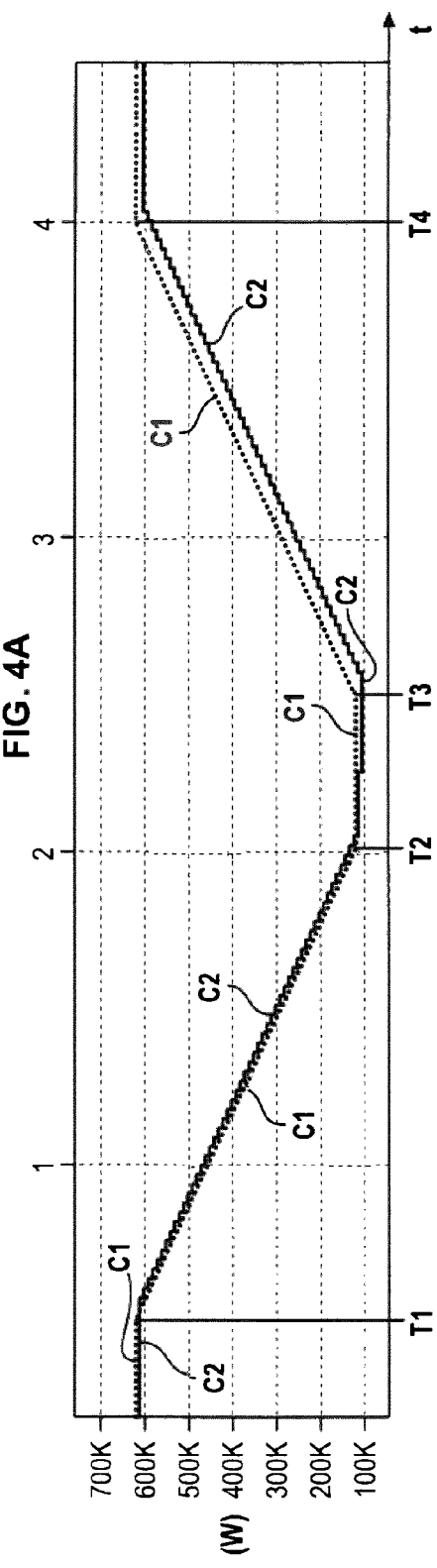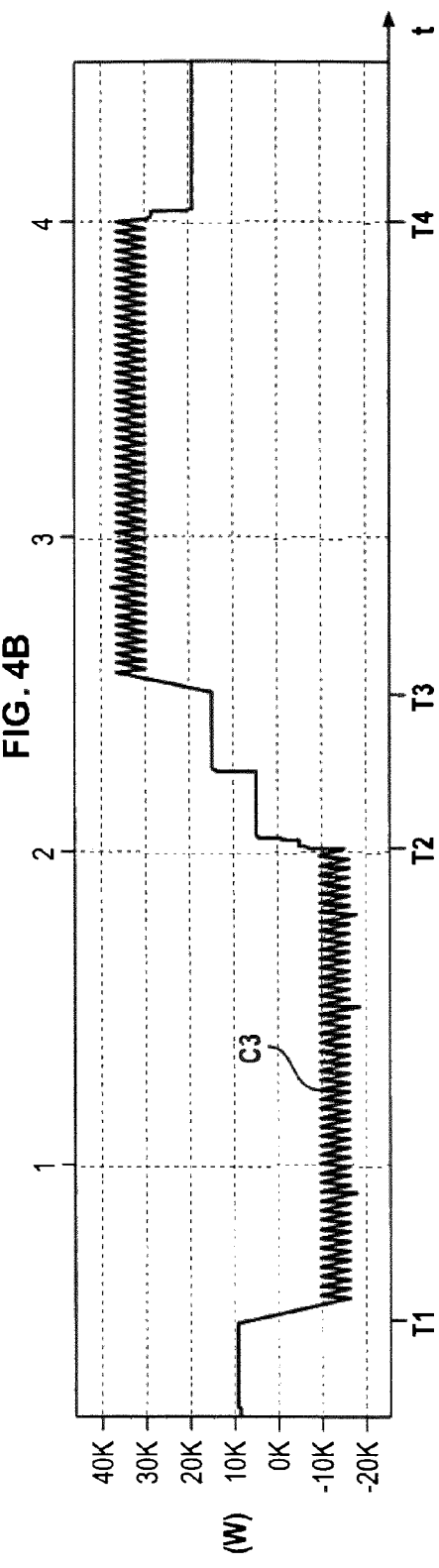

US 10,014,688 B2

SIMULATION CIRCUIT OF AN ALTERNATING ELECTRIC GRID AND METHOD FOR CONTROLLING SAME

CROSS-REFERENCE TO RELATED APPLICATION

The present application is a national phase entry under 35 U.S.C. § 371 of International Application No.: PCT/EP2014/064254, filed Jul. 3, 2014, which claims priority from French Application No.:1356670 filed Jul. 5, 2013 published in French, all of which are incorporated herein by reference.

The present invention relates to a simulation circuit of an alternating electric grid.

A field of application of the invention can be such a simulation circuit for at least one photovoltaic panel or at least one photovoltaic plant. In particular, a case of application can be that where the simulation circuit must be connected to the AC side of an inverter of at least one photovoltaic panel.

BACKGROUND OF THE INVENTION

Photovoltaic solar panels can be the cause of irreversible degradation in performance when exposed to light in open circuit over a long period. In particular, when the photovoltaic panels are installed on a site waiting to be connected to an electricity evacuation grid, they are exposed to light and are in open circuit. This phenomenon penalises the profitability of photovoltaic projects whereof the date of attachment to the electricity evacuation grid occurs several months after installation of photovoltaic modules.

One of the solutions known to date is to position on the direct current circuit of photovoltaic panels, resistors of fixed load directly at output of the solar modules. But this solution, the advantage of which is being inexpensive, fails to control the operation point of the photovoltaic panels as a function of solar radiation and therefore does not meet needs. In fact, manufacturers of photovoltaic panels recommend having them supply always at the point of maximum power.

Document US-A-2013/00 63 993 describes an emulator of alternating grid to be attached to the inverter of a photovoltaic generator. This emulator comprises a bank of resistors which can be selectively connected by switchs to the AC side of the photovoltaic inverter of the photovoltaic generator. Also, a source of alternating current is attached to the AC side of the photovoltaic inverter and in parallel with the bank of resistors. This document indicates that in case of rapid variations in power to be dissipated the source of alternating current has a sufficient margin to regulate the equivalent resistance of the bank of resistors to prevent current from reversing to this source. This source of alternating current can be a programmable source according to this document, this source in turn being connected to an electric power grid.

Consequently, the device described by this document has limitations as to the use of a source of alternating current and is complicated to execute.

Document CN-U-2028 18 122 describes an alternating grid emulator, comprising an AC to DC conversion module, an IGBT, a serial-parallel output module, a filtering circuit and a three-phase output circuit.

This device also has the disadvantage of needing a source of alternating current, this source in turn being connected to an electric power grid.

In this way, each of the devices described by both documents US-A-2013/00 63 993 and CN-U-2028 18 122 needs a source of alternating current, whereas the aim is to just be able to simulate on the AC side the presence of a grid of alternating current without making a connection to such a grid of alternating current.

BRIEF SUMMARY OF THE INVENTION

The aim of the invention is to provide a simulation circuit of an alternating electric grid, and a method for controlling this circuit, which eliminate the disadvantages of the prior art when the photovoltaic panel or the photovoltaic plant or more generally an electricity generation unit is waiting to be connected to an electricity evacuation grid generated by this panel or by this plant or by this electricity generation unit and without using an electric power grid.

For this purpose, a first subject matter of the invention is a simulation circuit for simulating an alternating electric grid, the circuit comprising at least one bank of first resistors capable of being selectively connected to the AC port by means of connection means,
characterized in that the circuit further comprises at least one reversible AC-DC converter comprising a second AC side connected to the AC port and a DC side connected to a direct current power dissipation sub-circuit connected to at least one electric battery capable of being charged with direct current and of being discharged with direct current.

The invention considerably lowers the cost of the system by dispensing with a source of alternating current and by combining resistors with electronic power components the size of which is reduced by the presence of resistors.

According to an embodiment of the invention, the electric battery is connected to the DC side of the converter.

According to an embodiment of the invention, the direct current power dissipation sub-circuit comprises a chopper including a first DC side of chopper, connected to the DC side of the converter, and a second DC side of chopper, connected to at least one second resistor.

According to an embodiment of the invention, the direct current power dissipation sub-circuit consists of a variable electronic load.

According to an embodiment of the invention, the connection means comprises one controller for selectively connecting and disconnecting each first resistor to and from the AC port.

According to an embodiment of the invention, the connection means include at least one switch connected in series to each first resistor, each switch comprising a switch control for controlling the switch to pass selectively to one and the other of a first closing position of the switch and a second opening position of the switch.

According to an embodiment of the invention, the AC port is intended to be connected to at least one electricity generation unit.

According to an embodiment of the invention, the AC port is intended to be connected to another AC side of at least one electricity generation unit.

According to an embodiment of the invention, the AC port is intended to be connected to the AC side of a first inverter of at least one photovoltaic panel or of a photovoltaic plant, having to supply alternating electric current via this AC side.

According to an embodiment of the invention, the AC port is intended to be connected to at least one electricity generation wind turbine.

According to an embodiment of the invention, the AC port is intended to be connected to at least one offshore electricity generation wind turbine.

According to an embodiment of the invention, the converter is a second inverter for dissipation of power received from the AC port on its second AC side and/or generation of power on the AC port from its second AC side.

A second subject matter of the invention is a method for controlling a simulation circuit for simulating an alternating electric grid as described above, characterized in that
a first power present on the AC port is measured,
a second setpoint load power of the battery is determined,
a difference parameter equal to the first power from which the second setpoint load power is subtracted, is calculated,
and during a control step, the connection or disconnection of each of the first resistors is controlled as a function of the difference parameter.

According to an embodiment of the invention, the first resistors have respective first resistive values whereof selection by the connection means enables to obtain a power of the bank of first resistors, which is an integer multiple of a pitch A of prescribed positive power,
a positive integer k is initialised at a prescribed value,
and to conduct the control step, it is examined:
if $D>(k+1)\cdot A+B$, in the affirmative to increase k by one unit, where D is the difference parameter, B is a prescribed constant positive less than A,
if $D<k\cdot A$, in the affirmative to decrease k by one unit, and if not, k is kept,
then the connection or disconnection of each of the first resistors is controlled by the connection means so that the power Pb of the bank of first resistors is equal to $Pb=k\cdot A$.

BRIEF DESCRIPTION OF THE DRAWINGS

The invention will be better understood from the following description given purely by way of non-limiting example in reference to the appended drawings, in which:

FIG. 4A illustrates a chronogram representing an example of the way in which the power of the bank of resistors follows the active power imposed on the simulation circuit according to an embodiment of the invention, FIG. 4B illustrates a chronogram of the active power of the second inverter of the simulation circuit in correspondence with FIG. 4A.

DETAILED DESCRIPTION OF THE DRAWINGS

Figure 1:
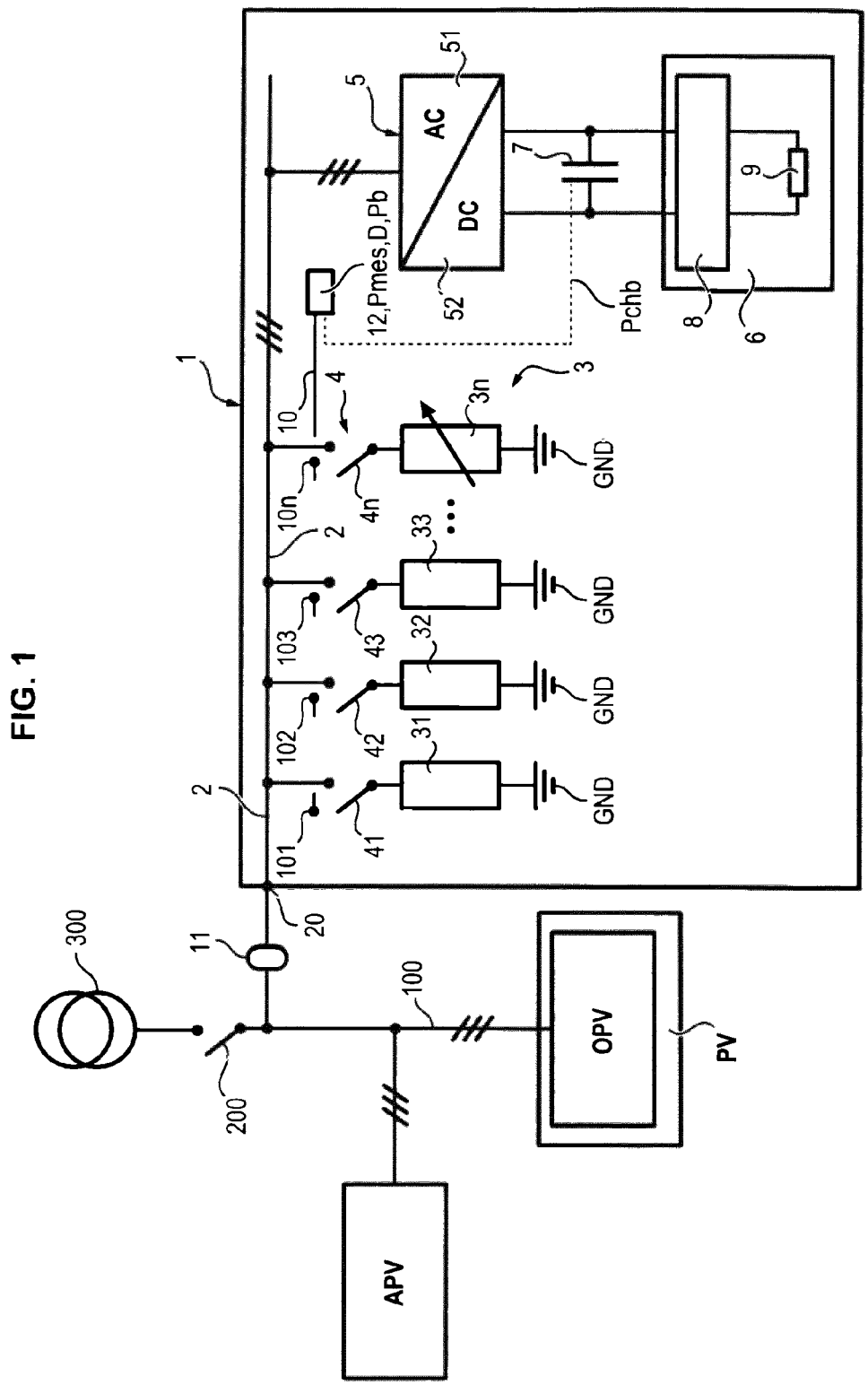
FIG. 1 illustrates an electric diagram of the simulation circuit according to an embodiment of the invention.

The simulation circuit 1 for simulating an alternating electric grid comprises at least one AC port 2 and a bank 3 of first resistors 31, 32, 33, ..., 3n. The first resistors 31, 32, 33, ..., 3n are capable of being selectively connected to the port 2 by means of connection means 4. In an embodiment, the circuit 1 simulates the presence of an alternating electric grid on the AC port 2.

This AC port 2, also called AC port 2, is intended to be connected to at least one electricity generation unit PV, for example to a first AC side 100 of at least one electricity generation unit PV. This electricity generation unit PV can comprise an alternating current generation element OPV on the first AC side 100. This alternating current generation element OPV can be an inverter OPV having to supply alternating electric current via this first AC side 100.

This electricity generation unit PV can be photovoltaic. This electricity generation unit PV can be at least one photovoltaic panel or a photovoltaic plant. For example, the AC port 2 is intended to be connected to the first AC side 100 of at least one first inverter OPV of at least one photovoltaic panel PV (or several photovoltaic panels PV) or of a photovoltaic plant PV (or several photovoltaic plants PV), having to supply alternating electric current via this AC side 100.

The electricity generation unit PV can be other than photovoltaic.

For example, the electricity generation unit PV can be or comprise at least one electricity generation wind turbine (PV). In this case, the AC port 2 is intended to be connected to at least one electricity generation wind turbine PV, for example to the first AC side 100 of an alternator OPV, having to supply alternating current via this first AC side 100. For example, the AC port 2 is intended to be connected to at least one offshore electricity generation wind turbine PV. In another example, the AC port 2 is intended to be connected to at least one terrestrial electricity generation wind turbine PV.

The invention is described hereinbelow in the case of a photovoltaic electricity generation unit PV. Of course, what is described hereinbelow is applicable to other cases mentioned hereinabove, with the reference PV, OPV able to be replaced by any electricity generation unit PV.

The simulation circuit 1 includes for example an input 20 connected to the AC port 2, this input 20 serving as connection to the AC side 100 of the photovoltaic inverter OPV. The first inverter OPV must supply alternating electric current via this AC side 100. For example, each first resistor 31, 32, 33, ..., 3n to the AC port 2 is capable of being connected in parallel to the AC port 2 (for example between the AC port 2 and the ground GND) by means of connection means 4.

The AC side 100 can also be connected to one or more auxiliary devices APV having to consume a part of the power supplied by the inverter OPV to the AC side 100. This or these auxiliary device(s) APV can comprise for example one or more auxiliary service transformers, which have to feed from the power supplied by the inverter OPV on the AC side 100 a control part (not shown) of the inverter OPV or a electric protective device of the inverter OPV, or a building where this inverter OPV is (for example, for lighting the building, or other). The AC side 100 of the inverter OPV can be also connected, by means of one or more switch or comutating devices 200, to one or more voltage step-up transformers 300, for example to step-up low voltage (for example 310 V alternating) supplied by the AC side 100 to alternating high voltage (which may be for example 20 kV alternating or 30 kV alternating).

Figure 2:
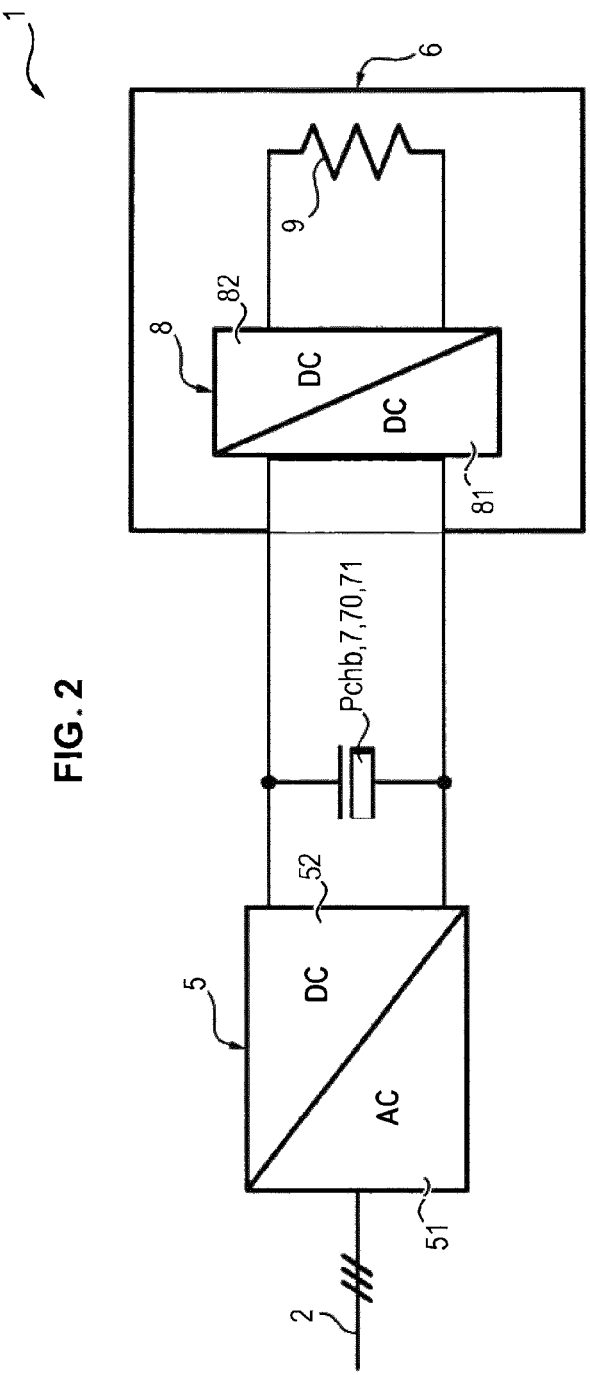
FIG. 2 illustrates an electric diagram of part of the simulation circuit as per FIG. 1.
Figure 5:
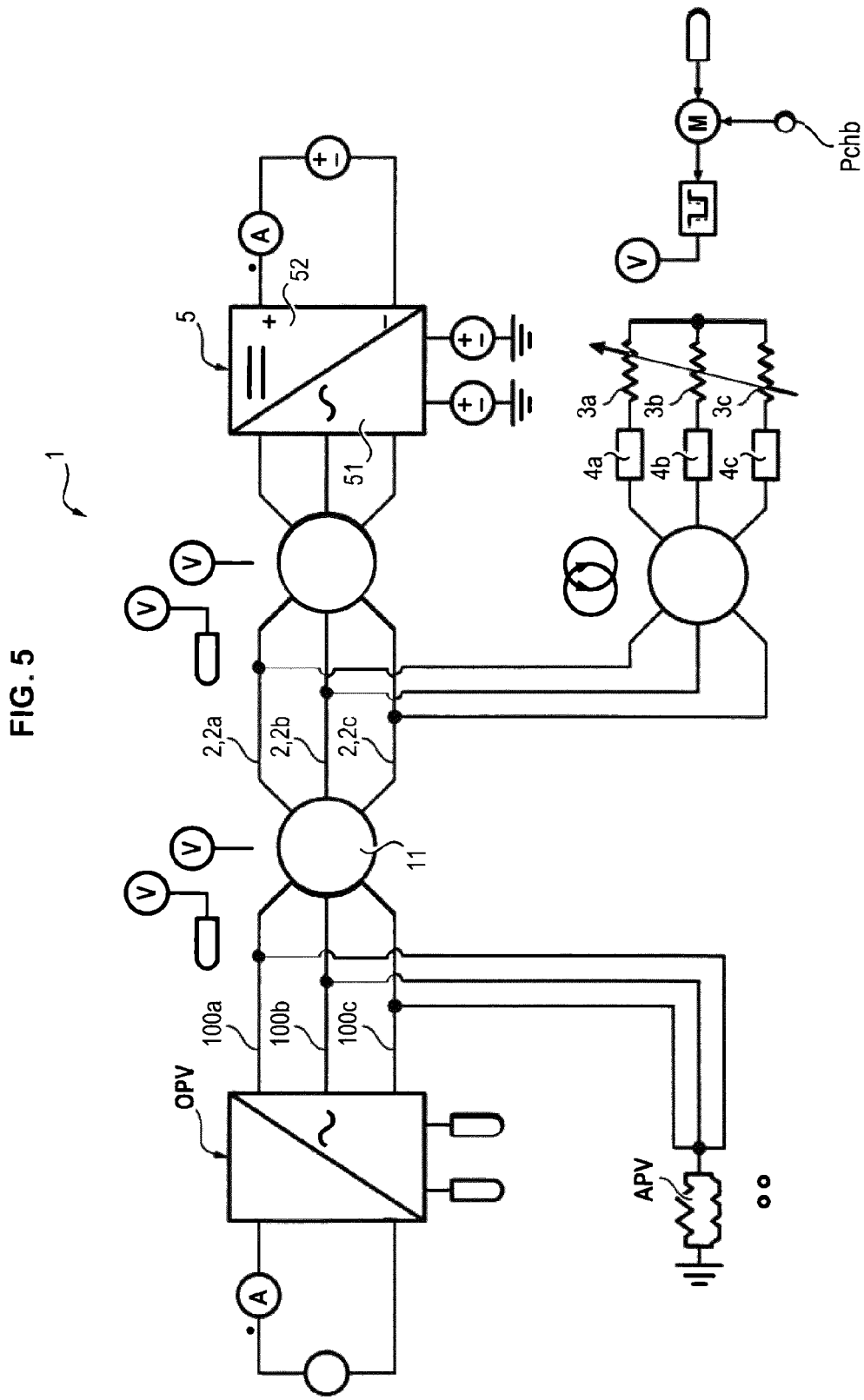
FIG. 5 illustrates an electric diagram of the simulation circuit according to an embodiment of the invention.

The AC side 100 is for example three-phase. In this case, the AC port 2 is also three-phase, as is shown in FIGS. 1 and 2 by the three oblique lines, and as is shown in FIG. 5. Consequently, three different banks 3a, 3b, 3c of resistors respectively for the three different phase conductors 2a, 2b, 2c of the AC port 2 can be provided as bank 3 of first resistors 31, 32, 33, ..., 3n in FIG. 5. The three banks 3a, 3b and 3c are capable of being connected respectively by connection means 4a, 4b and 4c to the phase conductors 2a, 2b, 2c. Similarly, when the AC side 100 is connected to the AC port 2 in this case, this AC side 100 includes three phase conductors 100a, 100b, 100c connected respectively to the phase conductors 2a, 2b, 2c of the AC port 2.

The AC port 2 can be alternating low-voltage three-phase or alternating high voltage three-phase, for example for a photovoltaic plant.

The simulation circuit 1 also includes at least one reversible AC-DC converter 5, whereof the second AC side 51 is connected to the AC port 2 and whereof the DC side 52 is connected to a direct current power dissipation sub-circuit 6. The direct current power dissipation sub-circuit 6 is connected to at least one electric battery 7 capable of being charged with direct current and capable of being discharged with direct current. In the following and the diagrams, the term direct current is indicated by DC, and the term alternating current is indicated by AC, as is known to the person skilled in the art.

The role of the converter 5 is to emulate a grid of alternating current enabling the inverter OPV to operate as if it were connected to a grid of alternating current. Therefore, when the solar panel PV is exposed to light or sun, the photovoltaic inverter OPV generates active power on its AC side 100. The bank 3 of resistors is controlled by the connection means 4 to adapt its consumed power so as to give the converter 5 only that power necessary to charge the battery 7 with direct current. However, in the case where the equivalent resistive value of the bank 3 of resistors varies incrementally and therefore cannot perfectly adapt the power of this bank 3 to the power generated by the photovoltaic inverter OPV, the converter 5 also serves in this case to dissipate power which is not taken over by the bank 3 of resistors. The inverter 5 is for example a transistor inverter of IGBT type.

According to an embodiment, the electric battery 7 is connected to the DC side 52 of the converter 5.

According to an embodiment of the invention, the direct current power dissipation sub-circuit 6 comprises a chopper 8 including a first DC side 81 of chopper, connected to the DC side 52 of the converter 5, and a second DC side 82 of chopper connected to at least one second resistor 9. This sub-circuit can also consist of variable electronic loads.

So the chopper 8 linked to the second resistor 9 connected to the DC side 52 of the converter 5 enables to dissipate power when the battery 7 is completely charged or when the power to be dissipated exceeds the load power of the battery.

During start-up phases, for example when the sun rises, the converter 5 emulates an alternating grid and, by way of the battery discharging to supply direct current to the converter 5, supplies the necessary power to the auxiliary device APV of the inverter OPV. The battery 7 is dimensioned to cover the power needs at least for these start-up phases.

According to an embodiment, the connection means 4 comprise a control input 10 for selectively connecting and disconnecting each first resistor 31, 32, 33, ..., 3n to and from the AC port 2. For example, the connection means 4 comprise at least one switch 41, 42, 43, ..., 4n connected in series respectively to each first resistor 31, 32, 33, ..., 3n. Each respective switch 41, 42, 43, ..., 4n includes a switch control input 101, 102, 103, ..., 10n to have it pass selectively to one and the other of a first closing position of the switch 41, 42, 43, ..., 4n and a second opening position of the switch 41, 42, 43, ..., 4n.

The converter 5 is an inverter 5 for dissipation of power received from the AC port 2 on its AC side 51 and/or power generation on the AC port 2 from its AC side 51, this power being supplied by discharge of the battery 7 in this second case. In the case where the converter 5 operates as dissipation of power received from the AC port 2 on its AC side 51, the AC-DC converter operates as rectifier (transformation of the alternating current AC of the second side 51 into direct current DC on the side 52). In the case where the converter 5 operates as power generation on the AC port 2 from its AC side 51, the AC-DC converter operates as inverter (transformation of the direct current DC on the side 52 into alternating current AC of the second side 51).

It is ensured that the battery 7 is initially charged with a determined load.

The converter 5 imposes alternating voltage of constant amplitude and constant frequency on the AC port 2 so as to emulate an alternating grid on this AC port 2 and therefore on the AC side 100 of the photovoltaic inverter OPV, when the latter is connected to the AC port 2 of the simulation circuit 1.

Another function of the converter 5 is to dissipate the power which is not consumed by the bank 3 of resistors, for example due to the discrete operating mode of the latter and of the control delay of the latter.

According to an embodiment, on the DC side 52 of the converter 5 the battery 7 keeps the direct voltage at a constant value, allowing proper operation of the converter 5.

According to an embodiment, the direct voltage supplied by the battery 7 to the DC side 52 of the converter 5 is greater than twice the simple peak voltage (this simple peak voltage being equal to half the peak to peak voltage) present on the AC port 2 and/or on the AC side 51 of the converter. This voltage of the battery 7 has for example sufficient margin to avoid commutation failures.

According to an embodiment, the chopper 8 is arranged to adjust the level of charge of the battery 7. The chopper 8 dissipates for example the power viewed by the converter 5 from which a setpoint load power Pchb of the battery 7 is subtracted. This setpoint load power Pchb of the battery is for example between 0 and the prescribed maximum load power PchMax of the battery.

According to an embodiment, the battery 7 comprises a regulation device 70 provided to determine this setpoint load power Pchb of the battery 7, for example as a function of a state of charge of the battery having been measured by measuring means 71 comprised by the battery 7.

Figure 3:
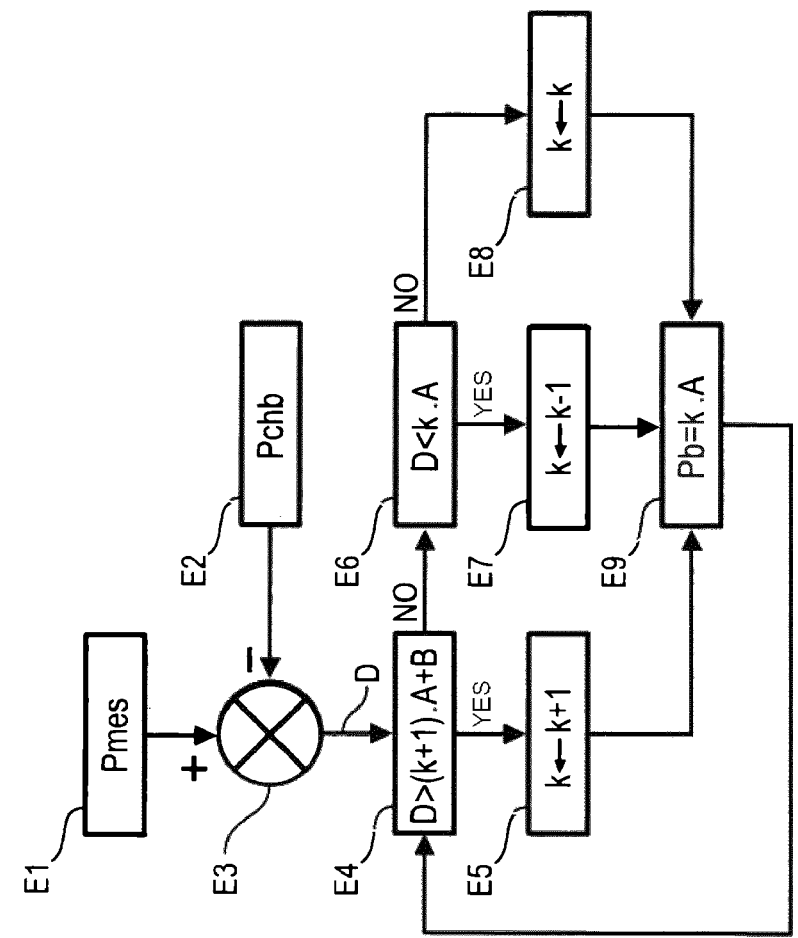
FIG. 3 illustrates an organigram of the method for controlling the simulation circuit according to an embodiment of the invention.

In reference to FIG. 3, a method for controlling the simulation circuit 1 according to an embodiment of the invention is described hereinbelow.

During a first step E1, a first power Pmes present on the AC port 2 is measured. This power Pmes is for example measured from measurement values supplied by at least one measuring element 11 provided on the AC port 2, for example on the input 20 of the AC port 2.

Then, during a step E2, the second setpoint load power Pchb of the battery 7 is determined.

During a step E3, a difference parameter D equal to the first power Pmes from which the second power Pchb is subtracted, is calculated. Then:

$$D = Pmes - Pchb.$$

This control method is executed for example by a control unit 12 connected to the control inputs 101, 102, 103, ..., 10n of the switchs 41, 42, 43, ..., 4n. This control unit 12 is consequently connected to the measuring element 11 and is capable of determining the power Pmes from the measurement supplied by this measuring element 11. The control unit 12 is also connected to the device 70 for determination of the setpoint load power Pchb of the battery 7, to receive this setpoint Pchb from the latter.

Next, during a control step, an embodiment of which will be described hereinbelow, the connection or disconnection of each of the first resistors 31, 32, 33, ..., 3n is controlled as a function of the difference parameter D.

In an embodiment, the first resistors 31, 32, 33, ..., 3n have first respective resistive values whereof selection by the connection means 41, 42, 43, ..., 4n enables to obtain a power of the bank 3 of first resistors, which is an integer multiple of a pitch A of prescribed positive power, non-zero. For example, the bank 4 of resistors has several levels of power, for example 10 kW, 2×20 kW, 50 kW, 100 kW, 200 kW, 300 kW, whereof the combination generates the sufficiently fine adjustment pitch A.

For example, the power of the bank 3 of first resistors 31, 32, 33, ..., 3n is adjusted by the commands sent by the unit 12 to the control inputs 101, 102, 103, ..., 10n of the connection means 41, 42, 43, ..., 4n to a value equal to k·A, where k is a positive integer.

For this, according to an embodiment the positive integer k is initialised at a prescribed value. Next, to perform control step, it is examined during step E4 if the difference parameter D is greater than (k+1)·A+B. In the affirmative at step E4, k is increased by a unit during step E5. B is a prescribed positive constant less than A.

In the negative at step E4, it is examined during step E6 if the difference parameter D is less than k·A. In the affirmative at step E6, k is decreased by one unit during step E7. In the negative at step E6, k is kept unchanged during step E8.

Steps E5, E7 and E8 are followed by step E9.

During step E9, the connection or the disconnection of each of the first resistors 31, 32, 33, ..., 3n is controlled by the connection means 4, 41, 42, 43, ..., 4n so that the power Pb of the bank 3 of first resistors is equal to Pb=k·A. The variation in power delivered by the inverter OPV (for example due to variation in luminosity on the photovoltaic panels) modifies the power Pmes measured by the measuring element 11 on the AC port 2 and therefore the calculated value of the difference parameter D. Consequently, step E9 is followed by step E4. Of course, step E3 could be followed, in place of step E4, by step E6 or by a step consisting of examining if D is both greater than k·A and less than (k+1)·A+B, with step E9 followed by this last step or step E4 or step E6.

The power dissipated by auxiliary devices of the bank 3 of resistors is taken into account by the internal control of the bank 3 of resistor by the control unit 12. Pmes is the power measured at the terminals of the converter 5, of the bank 3 of first resistors by subtracting the power of all the auxiliary devices of the bank 3. k represents the adjustment position of the bank 3 of first resistors. In this way, the delay between measurement of the power Pmes to be dissipated and the change in pitch k is taken into account by the circuit 1. The control unit 12 is provided so that the bank 3 of first resistors consumes no more power than the power setpoint Pb which it receives.

In FIG. 4A, the curve C1 corresponds to a variation in power imposed on the AC port 2 on its connection input 20 to the AC side 100 of the photovoltaic inverter OPV, for example by the fact that this AC side 100 provides electric current coming from the photovoltaic inverter OPV due to conversion of light received by the photovoltaic panel or the photovoltaic plant into this electric current.

For example, when the sunshine is constant on the photovoltaic panel PV, the curve C1 has a constant value before the time T1 and after the time T4. When the curve C1 decreases from the time T1 to the time T2, this corresponds to a drop in sunshine on the photovoltaic panel PV, which generates less current, this being for example the case when night approaches or when the sky is overcast. Inversely, the curve C1 continues to increase from the time T3 to time T4 when the sunshine increases over time, which generates more current to the inverter OPV, this being the case for example at sunrise or when the sky clears.

The curve C2 represents the power Pb of the bank 3 of first resistors. In FIG. 4B, the curve C3 represents the active power of the converter 5. The curves C1, C2, C3 are given as a function of the time t graduated in the same way as in FIGS. 4A and 4B in abscissa (in seconds).

The curve C2 follows with a slight time delay and following successive levels (with the pitch A between the consecutive levels) the curve C1.

Therefore, when the power Pmes on the input 20 of the AC port 2 reduces (decreasing curve C1), the connection means 4 are actuated to boost the equivalent resistance of the bank 3 of resistors viewed by the input 20, which reduces the control power Pb of the bank 3. During this time, the active power of the converter 5 is negative according to the curve C3 between the time T1 and T2, meaning that the converter 5 supplies power to the AC port 2 on its AC side 51 to compensate the difference between Pmes (curve C1) and Pb (curve C2). In this case, between T1 and T2, the battery 7 discharges to supply to the side 52 of the converter 5 a direct current which is transformed by this converter 5 into alternating current supplied by its AC side 51 to the AC port 2.

Between the time T3 and T4, when the power Pmes on the input 20 increases according to the curve C1, the power Pb of the bank 3 of resistors (curve C2) also follows in successive levels (with, between two consecutive levels, the pitch A) the power Pmes on the input 20 (curve C1) with a time delay. In this case, between the time T3 and T4, the converter 5 dissipates active power by absorbing on its AC side 51 power received from the AC port 2 (curve C3 positive in this case). In this case, the current received on the AC side 51 of the converter 5 is transformed by the latter into direct current exiting on its second AC side 52 to charge the battery 7. When the battery 7 is fully charged or has reached its maximum load power PchMax, the electric current supplied by the DC side 52 of the converter 5 is sent to the chopper 8 which transforms it into another direct current passing into the second resistor 9 to dissipate a corresponding power in this resistor 9. The chopper 10 causes dissipation in the second resistor 9 of the power viewed by the converter 5, from which it subtracts the setpoint load power Pchb of the battery 7.

According to an embodiment, the invention relates to a circuit (1) for simulating of an alternating electric grid, the circuit having at least one AC port (2) intended to be connected to the AC side (100) of a first inverter (OPV) of at least one photovoltaic panel (PV) or a photovoltaic plant, having to supply alternating electric current via this AC side, the circuit (1) comprising at least one bank (3) of first resistors (31, 32, 33, ..., 3n) capable of being selectively connected to the AC port (2) by means of connection means (4, 41, 42, 43, ..., 4n), characterized in that the circuit further comprises at least one second inverter (5) comprising a second AC side (51) connected to the AC port (2) and a DC side (52) connected to a direct current power dissipation sub-circuit (6) connected to at least one electric battery (7) capable of being charged with direct current and of being discharged with direct current.

According to an embodiment, in the case of at least one wind turbine in or constituting the electricity generation unit PV, the circuit 1 can serve to verify that for a determined wind speed, the electricity generation unit PV with wind turbine(s) generates a determined quantity of electricity (for example power). In an embodiment, the circuit 1 simulates the presence of an alternating electric grid and simulates for example a variable load in which the at least one wind turbine PV could supply electric current at different wind speeds. For example, the power Pmes delivered by the wind turbine(s) PV is measured by the measuring element 11, to then determine how many and/or which resistors 31, 32, 33, ..., 3n of the bank 3 of resistors are to be utilised. In an embodiment, the circuit 1 can serve as test circuit of the at least one wind turbine PV, before the definitive attachment of this at least one wind turbine PV to the electric evacuation electricity grid. In an embodiment, the attachment provides attachment of the at least one wind turbine PV to an inter-array, which in turn must be attached to the port 2. Therefore, according to an embodiment, the circuit 1 can serve to conduct reception tests of offshore wind turbines.

The invention claimed is:

1. A simulation circuit for simulating an alternating electric grid, the circuit having at least one AC port, the circuit comprising at least one bank of first branches connected in parallel to the AC port, each first branch comprising at least one first resistors and at least one switch to selectively connect the at least one first resistor to the AC port
   wherein the circuit further comprises at least one reversible AC-DC converter comprising a second AC side connected to the AC port and a DC side connected to a direct current power dissipation sub-circuit connected to at least one electric battery capable of being charged with direct current and of being discharged with direct current.

2. The circuit according to claim 1, wherein the electric battery is connected to the DC side of the at least one reversible AC-DC converter.

3. The circuit according to claim 1, wherein the direct current power dissipation sub-circuit comprises a chopper including a first DC side of chopper, connected to the DC side of the at least one reversible AC-DC converter, and a second DC side of chopper, connected to at least one second resistor.

4. The circuit according to claim 1, wherein the direct current power dissipation sub-circuit consists of a variable electronic load.

5. The circuit according to claim 1, further comprising one controller for selectively connecting and disconnecting each first resistor to and from the AC port.

6. The circuit according to claim 1, wherein in each first branch the at least one switch is connected in series to each first resistor, each switch comprising a switch control for controlling the switch to pass selectively to one and the other of a first closing position of the switch and a second opening position of the switch.

7. The circuit according to claim 1, wherein the AC port is intended to be connected to at least one electricity generation unit.

8. The circuit according to claim 1, wherein the AC port is intended to be connected to another AC side of at least one electricity generation unit.

9. The circuit according to claim 1, wherein the AC port is intended to be connected to the AC side of a first inverter of at least one photovoltaic panel or of a photovoltaic plant, having to supply alternating electric current via the AC side.

10. The circuit according to claim 1, wherein the AC port is intended to be connected to at least one electricity generation wind turbine.

11. The circuit according to claim 1, wherein the AC port is intended to be connected to at least one offshore electricity generation wind turbine.

12. The circuit according to claim 1, wherein the at least one reversible AC-DC converter is a second inverter for dissipation of power received from the AC port on its second AC side and/or generation of power on the AC port from its second AC side.

13. A method for controlling a simulation circuit for simulating an alternating electric grid according to claim 1, wherein
   a first power present on the AC port is measured,
   a second setpoint load power of the battery is determined,
   a difference parameter equal to the first power from which the second setpoint load power is subtracted, is calculated,
   and during a control step, the connection or disconnection of each of the first resistors is controlled as a function of the difference parameter.

14. The method according to claim 13, wherein the first resistors have respective first resistive values whereof selection enables to obtain a power of the bank of first resistors, which is an integer multiple of a pitch A of prescribed positive power,
   a positive integer k is initialized at a prescribed value,
   and to conduct the control step, it is examined:
      if $D>(k+1)\cdot A+B$, in the affirmative to increase k by one unit, where D is the difference parameter, B is a prescribed constant positive less than A,
      if $D<k\cdot A$, in the affirmative to decrease k by one unit,
      and if not, k is kept,
   then the connection or disconnection of each of the first resistors is controlled so that the power Pb of the bank of first resistors is equal to $Pb=k\cdot A$.

* * * * *

UNITED STATES PATENT AND TRADEMARK OFFICE
CERTIFICATE OF CORRECTION

PATENT NO.         : 10,014,688 B2
APPLICATION NO.    : 14/902816
DATED              : July 3, 2018
INVENTOR(S)        : Franck Aragnou and Denis Cardoso-Rodrigues Page 1 of 1

It is certified that error appears in the above-identified patent and that said Letters Patent is hereby corrected as shown below:

In the Claims

Column 9, Line 21, Claim 1, "resistors" should read -- resistor --

Signed and Sealed this
Thirtieth Day of October, 2018

Andrei Iancu
*Director of the United States Patent and Trademark Office*